United States Patent
Hsu

(10) Patent No.: US 7,403,398 B2
(45) Date of Patent: Jul. 22, 2008

(54) POSITIONING MEMBER FOR SECURING IN POSITION ADD-ON BOARD

(75) Inventor: Yung-Chin Hsu, Taipei (TW)

(73) Assignee: Inventec Corporation, Taipei (TW)

( * ) Notice: Subject to any disclaimer, the term of this patent is extended or adjusted under 35 U.S.C. 154(b) by 104 days.

(21) Appl. No.: 11/408,464

(22) Filed: Apr. 21, 2006

(65) Prior Publication Data

US 2007/0247797 A1    Oct. 25, 2007

(51) Int. Cl.
    *H05K 7/14*    (2006.01)
(52) U.S. Cl. .......................... 361/801; 361/802
(58) Field of Classification Search .......... 361/769, 361/801, 802
    See application file for complete search history.

(56) References Cited

U.S. PATENT DOCUMENTS

| | | | |
|---|---|---|---|
| 6,185,104 B1 * | 2/2001 | Obermaier | 361/759 |
| 7,061,774 B2 * | 6/2006 | Zhang | 361/818 |
| 2002/0109975 A1 * | 8/2002 | Boe | 361/801 |
| 2004/0174687 A1 * | 9/2004 | Wang et al. | 361/801 |
| 2006/0133059 A1 * | 6/2006 | Dean et al. | 361/801 |

* cited by examiner

*Primary Examiner*—Dean A. Reichard
*Assistant Examiner*—Yuriy Semenenko
(74) *Attorney, Agent, or Firm*—Jianq Chyun IP Office

(57) ABSTRACT

A positioning member for securing in position an add-on board is proposed, which is disposed inside an electronic device. The positioning member includes a coupling portion for coupling the positioning member to the inside of the electronic device, and a block portion attached to the coupling portion for preventing the add-on board electrically connected to a motherboard installed inside the electronic device from occurring any undesirable displacement. As the block portion is capable of being resiliently movable relative to the coupling portion, it allows the engagement and disengagement of the add-on board with the motherboard to be easily carried out without use of any auxiliary tool.

14 Claims, 4 Drawing Sheets

POSITIONING MEMBER FOR SECURING IN POSITION ADD-ON BOARD

BACKGROUND OF THE INVENTION

1. Field of the Invention

The present invention relates to positioning members, and more particularly, to a positioning member for securing an add-on board to a motherboard installed inside an electronic device.

2. Description of the Prior Art

With constant advancement and development of technology, electronic devices have become indispensable to modern people's daily lives. An electronic device (for example, a host computer or a server) nowadays is demanded to have not only a reduced size but also enhanced performance. To meet with such a demand, more electronic components are required to be accommodated in a limited space. Among them, installation of an add-on board on a motherboard mounted inside an electronic device is an example that the functionality of the electronic device is improved.

FIG. 1 shows a partially perspective view of an add-on board 11 disposed on a motherboard 12 installed inside a housing 13 of an electronic device in a known manner. As shown in the drawing, disposed on the add-on board 11 are a connection port 112 and two sockets 111 corresponding to two plugs 121 disposed on the motherboard 12. For the add-on board 11 to be electrically connected to and disposed on the motherboard 12, the two sockets 111 of the add-on board 11 have to be coupled to the two plugs 121 on the motherboard 12. This allows the connection port 112 of the add-on board 11 to reach into an opening 131 formed on the housing 13 of the electronic device so that the connection port 112 is exposed to the ambient via the opening 131 on the housing 13 of the electronic device. Accordingly, a connector (not shown) of an external cable is able to be inserted into the connection port 112.

However, in the situation where a connector of an external cable is inserted into the connection port 112 of the add-on board 11, as the add-on board 11 is coupled to the two plugs 121 on the motherboard 12 via mere two sockets 111, during the coupling process both the two sockets 111 and the two plugs 121 are subjected to an insertion-related force exerted by the connector of the external cable. When in the presence of an excessive force, the add-on board 11 tends to be forced to inwardly move such that the coupling of the sockets 111 of the add-on board 11 to the plugs 121 of the motherboard 12 may be damaged. In an even worse case, both the sockets 111 and the plugs 121 may even deform to thereby damage the add-on board 11 and the motherboard 12.

In view of the aforesaid drawback, a method for securing an add-on board to a motherboard and thereby installing the add-on board inside the housing of an electronic device is then proposed. Referring to FIG. 2, two bolts 222 are disposed on a motherboard 22 mounted with two plugs 221, and two apertures 213 corresponding to the bolts 222 are formed in the add-on board 21 equipped with a connection port 212 and two sockets 211. After the coupling of the sockets 211 of the add-on board 21 to the plugs 221 of the motherboard 22, screws 24 are screwed into the bolts 222 via the apertures 213 such that the add-on board 21 is secured in position to the motherboard 22. In the meantime, the connection port 212 of the add-on board 21 is allowed to be exposed through the opening 231 formed on the housing 23 of the electronic device, so as to be connected to a connector (not shown) of an external cable.

However, the aforesaid design of locking the add-on board 21 on the motherboard 22 by means of the bolts 222 and screws 24 has its drawbacks. The assembly/disassembly of the add-on board 21 requires a tool to carry out, that entails trivial and labor-consuming steps. Moreover, it necessitates the formation of a plurality of apertures 213 on the add-on board 21 and the bolts 222 on the motherboard 22 respectively. In consequence the layout density of the add-on board 21 decreases and the manufacturing cost of the add-on board 21 and the motherboard 22 increases.

Accordingly, an issue that currently needs urgent solution involves overcoming the drawbacks of the aforementioned prior art.

SUMMARY OF THE INVENTION

Accordingly, to solve the drawbacks of the aforementioned conventional technology, it is a primary objective of the present invention to provide a positioning member for securing in position an add-on board on a motherboard installed in a housing of an electronic device.

Another objective of the present invention is to provide a positioning member for securing in position an add-on board in an electronic device that is capable of preventing the coupling of a connector of an external cable to a connection port of the add-on board from damaging the electrical connection of the motherboard and the add-on board.

Yet another objective of the present invention is to provide a positioning member for securing in position an add-on board that allows assembly/disassembly of the add-on board to/from a motherboard installed in an electronic device to be realized without the use of any tool.

A further objective of the present invention is to provide a positioning member for securing in position an add-on board that allows assembly/disassembly of the add-on board to/from a motherboard installed in an electronic device to be carried out conveniently in operation and economically in cost.

In order to achieve the above and other objectives, the present invention provides a positioning member for securing in position an add-on board. The positioning member is adapted to be disposed in an electronic device to secure in position an add-on board mounted with a connection port in the electronic device, allowing the add-on board to be prevented from occurring any displacement relative to a motherboard installed in the electronic device on which the add-on board is mounted. The positioning member comprises a coupling portion for securing the positioning member to a predetermined location inside the electronic device, and a block portion attached to the coupling portion and capable of being resiliently movable relative to the coupling portion such that under no external force exerted to the block portion, the block portion abuts against the connection port of the add-on board in a manner that the block portion stops the connection port from being withdrawn into an inside of the electronic device from an opening formed on the electronic device for exposing the connection port to the ambient and, when subjected to an external force, the block portion is moved to a position where the connection port is free from being stopped by the block portion, so as to allow the add-on board to be disconnected from a motherboard with which the add-on board is electrically connected.

The positioning member is a spring sheet formed by stamping. A plurality of apertures may be formed in the coupling portion such that, with the use of screws via the apertures, the positioning member is capable of being coupled to an electronic component disposed inside the electronic device or the housing of the electronic device; the coupling portion may also be secured inside the electronic device by soldering or any other conventional coupling means.

In the present invention, given that the block portion of the positioning member is capable of being resiliently movable relative to the coupling portion, to change the add-on board, it merely requires applying a force to the block portion to remove the block portion from the position that blocks the connection port of the add-on board from being withdrawn from the opening of the electronic device. Accordingly, an add-on board can be easily installed/uninstalled on/from a motherboard mounted inside an electronic device without using a tool according to the present invention.

DETAILED DESCRIPTION OF THE PREFERRED EMBODIMENTS

The following specific embodiments are provided to illustrate the present invention. Others skilled in the art can readily gain an insight into other advantages and features of the present invention based on the contents disclosed in this specification. The present invention can also be performed or applied in accordance with other different embodiments. Various modifications and changes based on different viewpoints and applications yet still within the scope of the present invention can be made in the details of the specification. Points needing attention are as follows: all the following diagrams are simplified schematic diagrams merely intended to illustrate the basic concepts of the present invention schematically, while the diagrams only show those elements related to the present invention; the diagrams were not drawn in accordance with the number, shape and dimensions of the elements implemented in practice; the appearance, quantity and scale of individual elements implemented in practice are optional, as far as a design is concerned.

First Embodiment

The electronic device referred to in the embodiment described below is, for example, a desktop PC, notebook computer, or server, etc. To simplify the illustration and describe the characteristics and the structure of the present invention clearly and comprehensibly, the drawings only show the structure immediately involved in the present invention but omit the remainder.

Figure 1:
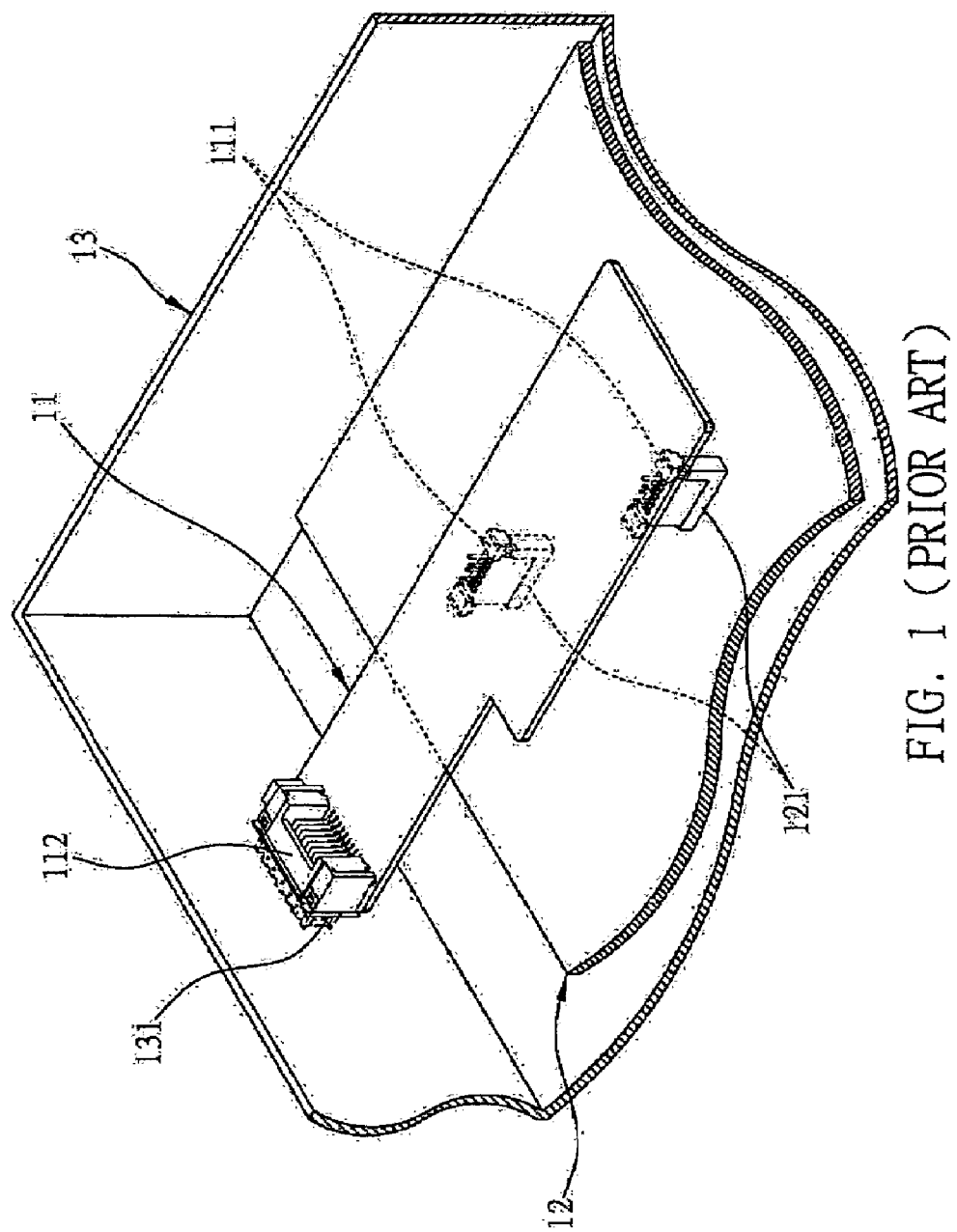
FIG. 1 (PRIOR ART) is a perspective view showing an add-on board installed on a motherboard disposed inside the housing of an electronic device according to the prior art.
Figure 2:
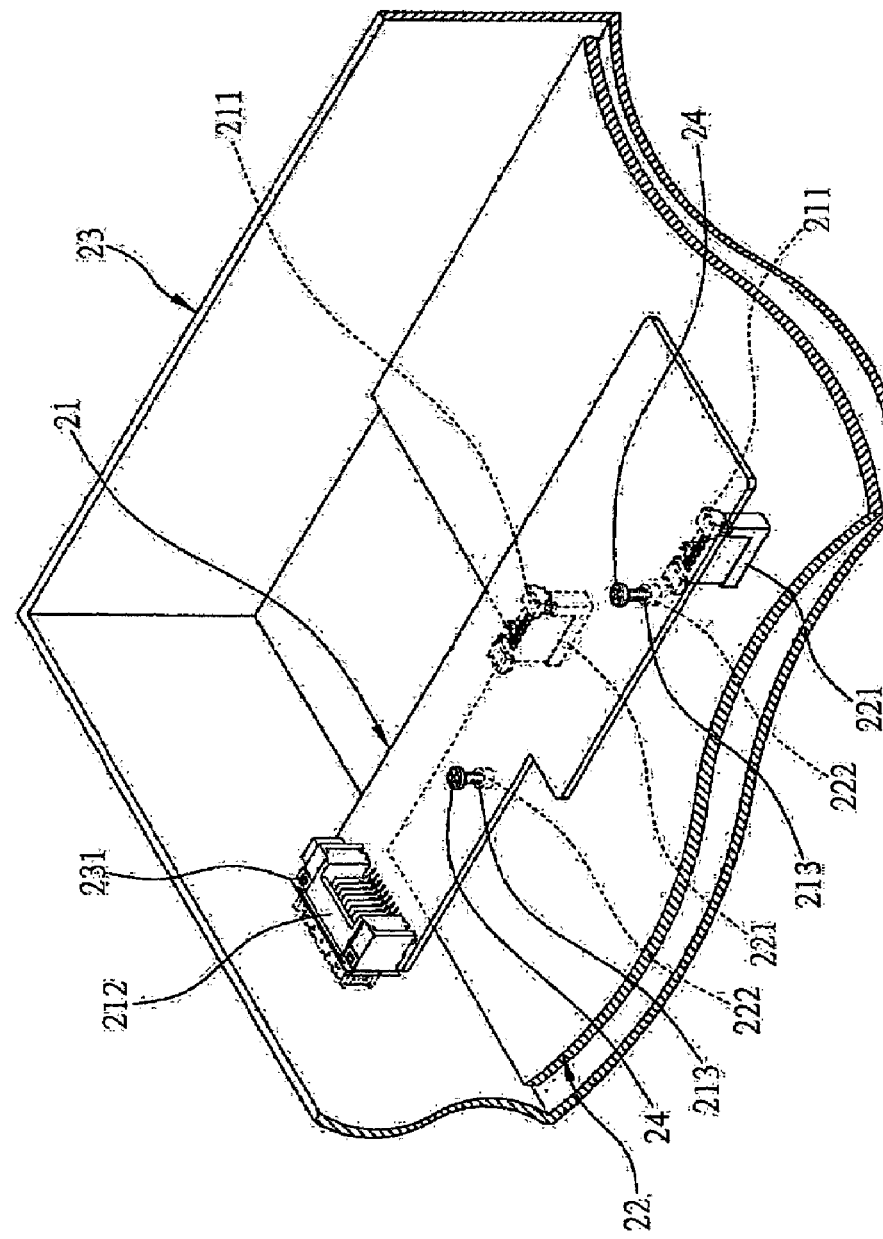
FIG. 2 (PRIOR ART) is a perspective view showing an add-on board installed on a motherboard disposed inside the housing of an electronic device according to another prior art.
Figure 3:
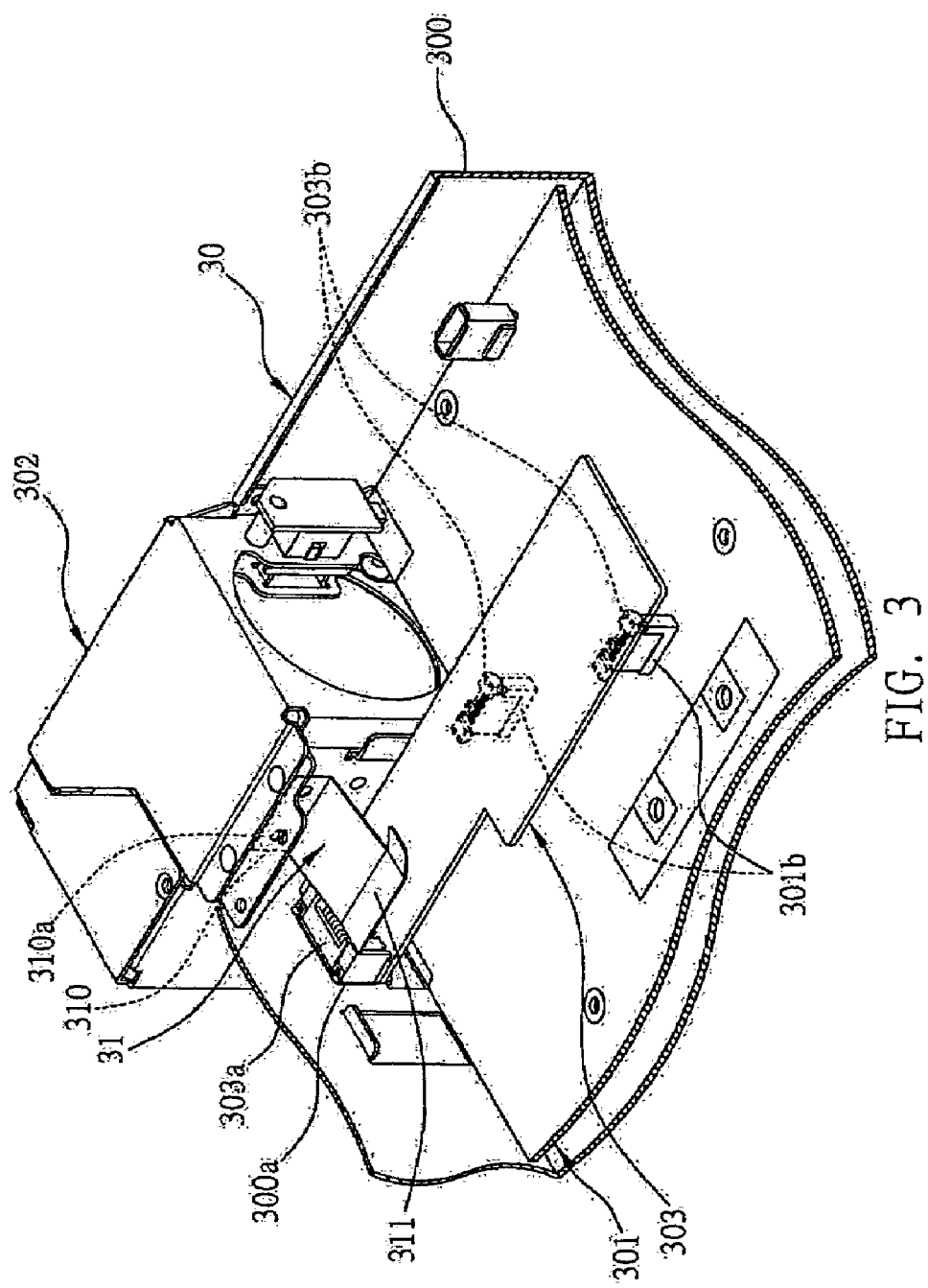
FIG. 3 is a perspective view showing an add-on board securely installed on a motherboard with the use of a positioning member, according to a first embodiment of the present invention.

Referring to FIG. 3, it shows a perspective view of a positioning member designed to secure in position an add-on board disposed inside an electronic device according to the first embodiment of the present invention. As shown in the drawing, the electronic device 30 comprises a housing 300, a motherboard 301 and an electronic component 302, both disposed inside the housing 300, and an add-on board 303 mounted on the motherboard 301. The add-on board 303 can be, for example, a display card, sound card, graphic card, network interface card, and etc. A positioning member 31 of the present invention is formed with a coupling portion 310 for coupling the positioning member 31 to the electronic component 302 disposed in the electronic device 30, and a block portion 311 integrated with the coupling portion 310. The block portion 311 is capable of being resiliently movable relative to the coupling member 310. Formed in the coupling portion 310 is an aperture 310a through which a screw (not shown) is screwed into the electronic component 302 to couple the positioning member 31 to the electronic component 302. Upon the coupling of the coupling portion 310 to the electronic component 302, the block portion 311 perpendicularly extending from the coupling portion 310 is capable of abutting against a connection port 303a mounted on the add-on board 303 which is exposed to an opening 300a of the housing 300. Accordingly, when a connector (not shown) of an external cable is inserted into the connection port 303a via the opening 300a of the housing 300, the insertion force exerted to the connection port 303a will not result in the displacement of the add-on board 303 with respect to the motherboard 301 for the reason that the freedom of displacement of the add-on board 303 is blocked by the block portion 311. In other words, connecting the connector of an external cable to the connection port 303a will not result in disconnection of the sockets 303b of the add-on board 303 from the plugs 301b of the motherboard 301, thereby the add-on board 303 and the motherboard 301 are prevented from damage as the sockets 303b of the add-on board 303 will not be disconnected from the plugs 301b of the motherboard 301, upon insertion of the connector into the connection port 303a.

Furthermore, the block portion 311 is capable of being resiliently movable relative to the coupling portion 310, thus in order to separate the add-on board 303 mounted on the motherboard 301 from the motherboard 301, it only needs to pull the block portion 311 upward to a distance that allows the block portion 311 not to block the connection port 303a from being withdrawn from the opening 300a. Then, the add-on board 303 can be separated from the motherboard 301 by unplugging the plugs 301b from the sockets 303b.

Hence, the present invention has the following advantages. The add-on board 303 can be conveniently secured on the motherboard 301 and separated from the motherboard 301 by means of the positioning member 31 of the present invention, without using any tool. The add-on board 303 can be secured on the motherboard 301 without additional processing of the motherboard 301 and the add-on board 303, such that the costs for manufacturing the motherboard 301 and add-on board 303 are not increased. Moreover, the reliability of the electrical connection between the add-on board 303 and the motherboard 301 is enhanced.

Second Embodiment

Figure 4:
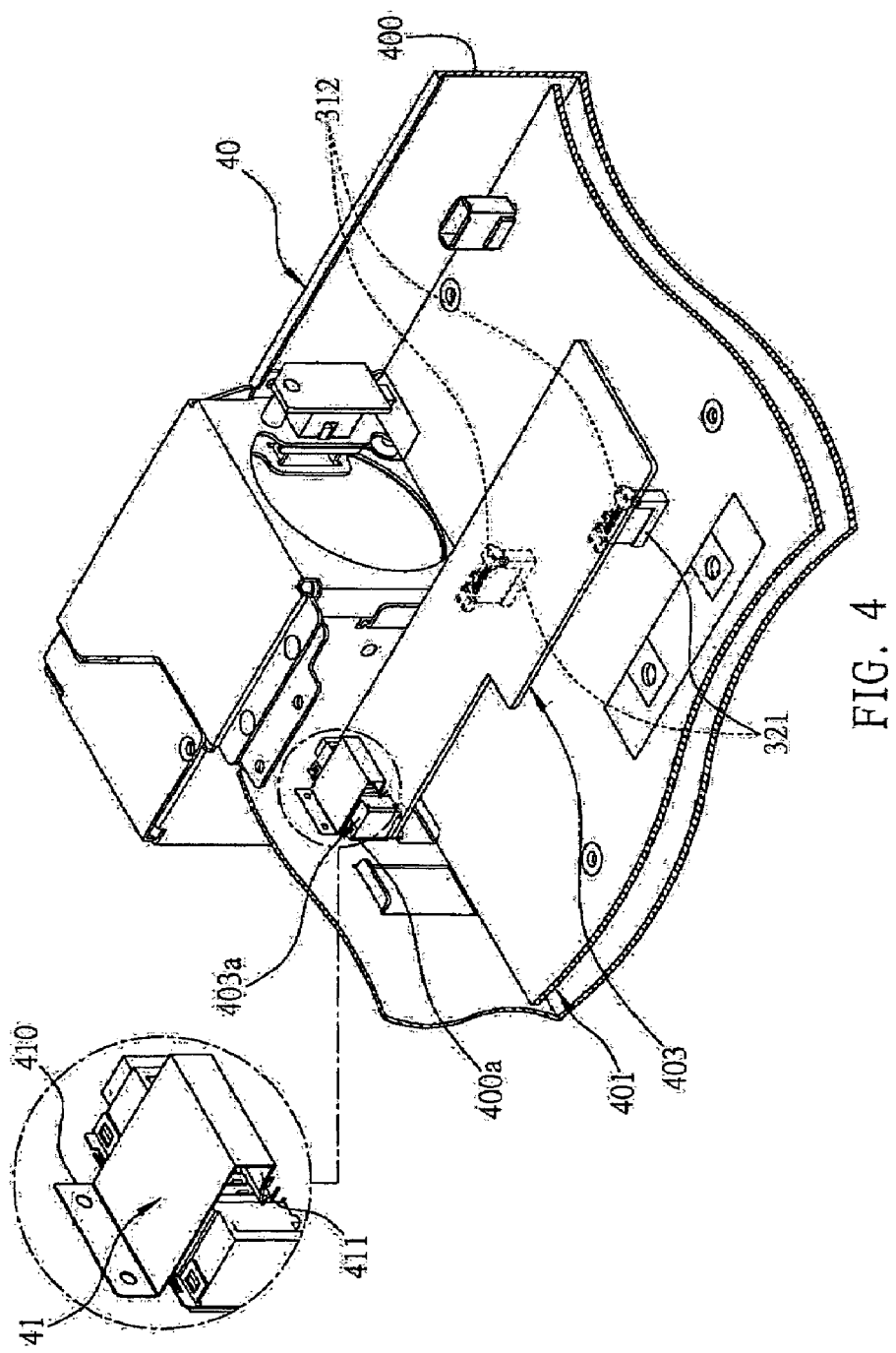
FIG. 4 is a perspective view showing an add-on board securely installed on a motherboard with the use of a positioning member, according to a second embodiment of the present invention.

Referring to FIG. 4, it shows a perspective view of a positioning member 41 designed to secure an add-on board 403 inside an electronic device according to the second embodiment of the present invention. The positioning member 41 of the second embodiment of the present invention differs from the first embodiment in the way that, the positioning member 41 is coupled to a housing 40 of the electronic device via a coupling portion 410. It allows a block portion 411 integral with the coupling portion 410 to engage with the add-on board 403 equipped with a connection port 403a and disposed inside the electronic device, so as to prevent the add-on board 403 from loosening when subjected to a force; however, a plurality of positioning members 41 may be formed, if firmer fixation is required.

Summarizing the above, the present invention is capable of readily preventing the add-on board 303 from loosening when subjected to a force, assembling/disassembling the add-on board 303 without using any tool, solving drawbacks of the prior art relating to deformation of the sockets 312 and the plugs 321 due to exerting excessive force, and damage done to the motherboard 32 and the add-on board 303, and thus the present invention has high industrial applicability.

The aforesaid embodiments merely serve as the preferred embodiments of the present invention. They should not be construed as to limit the scope of the present invention in any way. Hence, any other changes can actually be made in the present invention. It will be apparent to those skilled in the art that all equivalent modifications or changes made, without departing from the spirit and the technical concepts disclosed by the present invention, should fall within the scope of the appended claims.

What is claimed is:

1. A positioning member for securing in position an add-on board with a connection port inside an electronic device, comprising:
    a coupling portion for coupling said positioning member to a predetermined location inside said electronic device; and
    a block portion attached to said coupling portion and capable of being resiliently movable relative to said coupling portion wherein, when subjected to no external force, said block portion abuts against said connection port of said add-on board in a manner that said block portion stops said connection port from being withdrawn into an inside of said electronic device from an opening formed on said electronic device for exposing said connection port to the ambient, and said block portion and said connection port are arranged in a line parallel to a motherboard with which said add-on board is electrically connected, and wherein, when subjected to an external force, said block portion is moved to a position where said connection port is free from being stopped by said block portion, so as to allow said add-on board to be disconnected from said motherboard.

2. The positioning member for securing in position an add-on board of claim 1, wherein said positioning member is a spring sheet.

3. The positioning member for securing in position an add-on board of claim 1, wherein said block portion is integrally formed with said coupling portion.

4. The positioning member for securing in position an add-on board of claim 1, wherein said coupling portion is coupled to an electronic component installed inside said electronic device.

5. The positioning member for securing in position an add-on board of claim 1, wherein said coupling portion is coupled to an inner surface of a housing of said electronic device.

6. The positioning member for securing in position an add-on board of claim 1, wherein said electronic device is one selected from the group consisting of a desktop computer, notebook computer and server.

7. The positioning member for securing in position an add-on board of claim 1, wherein said add-on board is one selected from the group consisting of a display card, sound card, graphic card and network interface card.

8. An electronic device, comprising:
    a housing having an opening;
    a motherboard disposed inside said housing;
    an add-on board structurally and electrically connected to said motherboard and having a connection port; and
    a positioning member for securing in position said add-on board inside said electronic device, the positioning member comprising:
        a coupling portion for coupling said positioning member to a predetermined location inside said electronic device; and
        a block portion attached to said coupling portion and capable of being resiliently movable relative to said coupling portion wherein, when subjected to no external force, said block portion abuts against said connection port of said add-on board in a manner that said block portion stops said connection port from being withdrawn into an inside of said electronic device from said opening of said housing for exposing said connection port to the ambient, and said block portion and said connection port are arranged in a line parallel to said motherboard, and wherein, when subjected to an external force, said block portion is moved to a position where said connection port is free from being stopped by said block portion, so as to allow said add-on board to be disconnected from said motherboard.

9. The electronic device of claim 8, wherein said positioning member is a spring sheet.

10. The electronic device of claim 8, wherein said block portion is integrally formed with said coupling portion.

11. The electronic device of claim 8 further comprising an electronic component installed inside said electronic device, wherein said coupling portion is coupled to said electronic component.

12. The electronic device of claim 8, wherein said coupling portion is coupled to an inner surface of said housing of said electronic device.

13. The electronic device of claim 8, wherein said electronic device is one selected from the group consisting of a desktop computer, notebook computer and server.

14. The electronic device of claim 8, wherein said add-on board is one selected from the group consisting of a display card, sound card, graphic card and network interface card.

* * * * *